(12) United States Patent
Igarashi

(10) Patent No.: US 7,738,180 B2
(45) Date of Patent: Jun. 15, 2010

(54) OBJECTIVE OPTICAL SYSTEM FOR ENDOSCOPES

(75) Inventor: Tsutomu Igarashi, Hachioji (JP)

(73) Assignee: Olympus Medical Systems Corp., Tokyo (JP)

(*) Notice: Subject to any disclaimer, the term of this patent is extended or adjusted under 35 U.S.C. 154(b) by 0 days.

(21) Appl. No.: 12/474,628

(22) Filed: May 29, 2009

(65) Prior Publication Data
US 2009/0296235 A1 Dec. 3, 2009

(30) Foreign Application Priority Data
May 30, 2008 (JP) ............... 2008-143184

(51) Int. Cl.
*G02B 21/02* (2006.01)
*G02B 3/00* (2006.01)

(52) U.S. Cl. .............. 359/656; 359/661; 359/726; 359/740; 359/741; 359/798; 359/810; 396/17; 348/45; 348/65

(58) Field of Classification Search .......... 359/656, 359/660, 661, 726, 740, 741, 798, 809, 810; 396/17; 348/45, 65
See application file for complete search history.

(56) References Cited

U.S. PATENT DOCUMENTS

| | | | |
|---|---|---|---|
| 4,916,534 A * | 4/1990 | Takhashi et al. | 348/67 |
| 4,986,642 A * | 1/1991 | Yokota et al. | 359/708 |
| 7,085,064 B2 * | 8/2006 | Uzawa et al. | 359/661 |
| 2005/0288557 A1 * | 12/2005 | Yokoi et al. | 600/176 |
| 2008/0252997 A1 * | 10/2008 | Duckett | 359/753 |

FOREIGN PATENT DOCUMENTS

| | | |
|---|---|---|
| JP | S60-026918 | 2/1985 |
| JP | S61-254917 | 11/1986 |
| JP | H05-341185 | 12/1993 |
| JP | H07-318799 | 12/1995 |
| JP | H09-262207 | 10/1997 |
| JP | H09-325285 | 12/1997 |
| JP | H10-239594 | 9/1998 |
| JP | H11-352413 | 12/1999 |

* cited by examiner

*Primary Examiner*—Evelyn A. Lester
(74) *Attorney, Agent, or Firm*—Arnold International; Bruce Y. Arnold

(57) ABSTRACT

An objective optical system for endoscopes has, in order form the object side, a single lens with negative power, a cemented lens with positive power, and an image sensor unit. The cemented lens has a plano-convex lens, located at the image-side end, with a convex surface facing the image side and an aperture stop placed proximate to a cemented portion and the image sensor unit includes an optically cemented body of at least one optical part, a path bending prism, and a solid-state image sensor to satisfy the following conditions:

$1.5 < T_B/f < 3.5$ $2.4 < T_C/f < 4$ where f is the focal length of the whole of the objective optical system, $T_B$ is the optical path length of the cemented lens, and $T_C$ is the optical path length of the image sensor unit.

18 Claims, 6 Drawing Sheets

OBJECTIVE OPTICAL SYSTEM FOR ENDOSCOPES

This application claims benefits of Japanese Patent Application No. 2008-143184 filed in Japan on May 30, 2008, the contents of which are incorporated herein by reference.

BACKGROUND OF THE INVENTION

1. Field of the Invention

This invention relates to an objective optical system for endoscopes.

2. Description of Related Art

A video scope loaded with a solid-state image sensor at the distal end of the inserting section of the endoscope is progressing in a sleek design of the endoscope due to compactness of the solid-state image sensor. The video scope with an inserting section outside diameter of about 5 mm, having a channel for treatment and a distal end bending mechanism, has already been popularized. However, a video scope with an inserting section outside diameter of about 3 mm is being still developed because of its high technical hurdles. In such an extremely fine video scope, a sectional area allowable for the solid-state image sensor or the objective optical system is limited to about 1 mm² or less. In the structure that the image pickup surface of the solid-state image sensor is provided perpendicular to an inserting axis (which is hereinafter referred to as "image pickup surface perpendicular placement"), it is very difficult to place circuit wiring and terminals adjacent to the outside of an effective image pickup section because of the size of the sectional area, and the mounting of the solid-state image sensor offers a great problem.

In contrast to this, the structure that the image pickup surface of the solid-state image sensor is provided nearly parallel to the inserting axis (which is hereinafter referred to as "image pickup surface parallel placement") does not increase the sectional area even when the circuit wiring and terminals are provided adjacent to the outside of the effective image pickup section, and thus this is favorable for the extremely fine video scope. However, in the image pickup surface parallel placement, a prism and mirror bending the optical axis toward the solid-state image sensor are absolutely essential and a severe restriction is imposed on the objective optical system, together with a reduction of the sectional area of the objective optical system itself.

For the image pickup surface parallel placement of the solid-state image sensor and the compact design of the objective optical system, conventional techniques disclosed in Japanese Patent Kokai Nos. Sho 61-254917, Hei 9-262207, Hei 11-352413, Sho 60-26918, Hei 10-239594, Hei-5-341185, Hei 7-318799, and Hei 9-325285 are known.

The technique disclosed in each of Kokai Nos. Sho 61-254917, Hei 9-262207, and Hei 11-352413 refers to a prism for the image pickup surface parallel placement and a solid-state image sensor unit structure. The technique disclosed in each of Kokai Nos. Sho 60-26918 and Hei 10-239594 has reference to a relatively compact design in the objective optical system for the image pickup surface parallel placement. The technique disclosed in each of Kokai Nos. Hei 5-341185, Hei 7-318799, and Hei 9-325285 is related to the simplification and compact design of the objective optical system, not for the image pickup surface parallel placement.

SUMMARY OF THE INVENTION

The objective optical system for endoscopes according to a first aspect of the present invention comprises, in order form the object side, a single lens A with negative power, a cemented lens B with positive power, and an image sensor unit C. The cemented lens B has a plano-convex lens, located at the image-side end, with a convex surface facing the image side and an aperture stop placed proximate to a cemented portion and the image sensor unit C includes an optically cemented body of at least one optical part, a path bending prism, and a solid-state image sensor to satisfy the following conditions:

$$1.5 < T_B/f < 3.5 \tag{1}$$

$$2.4 < T_C/f < 4 \tag{2}$$

where f is the focal length of the whole of the objective optical system, $T_B$ is the optical path length of the cemented lens B, and $T_C$ is the optical path length of the image sensor unit C.

The objective optical system for endoscopes according to a second aspect of the present invention comprises, in order form the object side, a singe lens A including a plano-concave lens, a cemented lens B with positive power, and an image sensor unit C. The cemented lens B includes one or more flat-plate-shaped optical parts, a plano-convex lens with a convex surface facing the image side, and an aperture stop placed proximate to a cemented portion and the image sensor unit C includes an optically cemented body of one or more flat-plate-shaped optical parts, a path bending prism, and a solid-state image sensor to satisfy Conditions (1) and (2).

The objective optical system for endoscopes according to a third aspect of the present invention satisfies the following conditions:

$$n_{AL} > 1.75 \tag{3}$$

$$n_{BL} > 1.75 \tag{4}$$

$$1 < |f_{BL}/f_{AL}| < 1.6 \tag{5}$$

$$0.65 < |T_{BL}/R_{BL}| < 1 \tag{6}$$

where $n_{AL}$ is the refractive index (the d line) of the single lens A, $n_{BL}$ is the refractive index (the d line) of the plano-convex lens of the cemented lens B, $f_{AL}$ is the focal length of the single lens A, $f_{BL}$ is the focal length of the plano-convex lens of the cemented lens B, $T_{BL}$ is the thickness of the plano-convex lens of the cemented lens B, and $R_{BL}$ is the radius of curvature of the convex surface of the plano-convex lens of the cemented lens B.

The objective optical system for endoscopes according to a fourth aspect of the present invention has a flare stop between the single lens A and the cemented lens B and the image sensor unit C has a flare stop proximate to an entrance surface cemented portion of the path bending prism.

According to a fifth aspect of the present invention, the cemented lens B comprises, in order from the object side, an optical part made from a near-infrared light absorbing material, an optical flat plate formed with an aperture stop of a metallic light-blocking film on a surface cemented to the plano-convex lens, and the plano-convex lens.

According to a sixth aspect of the present invention, the path bending prism has an entrance surface, a reflecting surface, and an exit surface and the reflecting surface is provided with a metallic reflecting film to satisfy the following conditions:

$$n_{CP} < 1.65 \tag{7}$$

$$1.1 < T_{CPF}/T_{CPR} < 2 \tag{8}$$

where $n_{CP}$ is the refractive index (the d line) of the path bending prism, $T_{CPF}$ is an optical path length from the entrance surface of the path bending prism to the reflecting surface, and $T_{CPR}$ is an optical path length from the reflecting surface of the path bending prism to the exit surface.

According to a seventh aspect of the present invention, the image sensor unit C includes a reflecting surface protecting member of glass or ceramic having a light transmitting property so that the reflecting surface protecting member is cemented to the reflecting surface of the path bending prism with a light curing-type adhesive.

According to an eighth aspect of the present invention, the optical part of the image sensor unit C is coaxial with the cemented lens B so that the effective image pickup surface of the solid-state image sensor is decentered in a direction perpendicular to a path bending section with respect to the center of the optical part and thereby a visual field is inclined in a direction perpendicular to the path bending section.

According to a ninth aspect of the present invention, the cemented lens B or the image sensor unit C includes a laser guide light attenuation filter therein to satisfy the following condition:

$$1 < \tau_G \cdot P_V^2 / F_{NO}^2 < 10 \qquad (9)$$

where $\tau_G$ is the transmittance (%) of guide light by the laser guide light attenuation filter, $P_V$ is the vertical pixel pitch (μm) of the solid-state image sensor, and $F_{NO}$ is an F-number.

According to a tenth aspect of the present invention, the cemented lens B or the image sensor unit C includes the near-infrared light absorbing material therein to satisfy the following condition:

$$1 < \tau_{650} \cdot P_V^2 / F_{NO}^2 < 10 \qquad (10)$$

where $\tau_{650}$ is the internal transmittance (%) of light with a wavelength of 650 nm by the near-infrared light absorbing material, $P_V$ is the vertical pixel pitch (μm) of the solid-state image sensor, and $F_{NO}$ is an F-number.

According to the present invention, it is possible to provide the objective optical system for endoscopes having the structure of the image pickup surface parallel placement that is high in mounting property even when a micro miniature design is attained.

These and other features and advantages of the present invention will become apparent from the following detailed description of the preferred embodiments when taken in conjunction with the accompanying drawings.

DETAILED DESCRIPTION OF THE PREFERRED EMBODIMENTS

In accordance with the drawings, the embodiments of the present invention will be explained below.

Embodiment 1

Figure 1A:
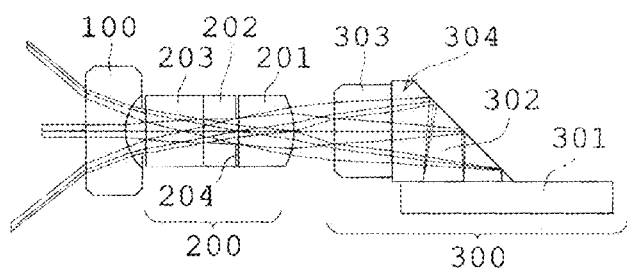
FIG. 1A is a view showing an optical arrangement of the objective optical system for endoscopes in Embodiment 1.
Figure 1B:
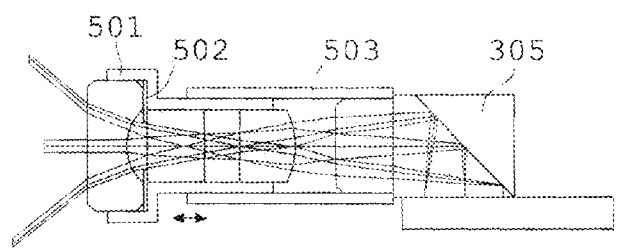
FIG. 1B is a view showing a lens frame structure in FIG. 1.
Figure 1C:
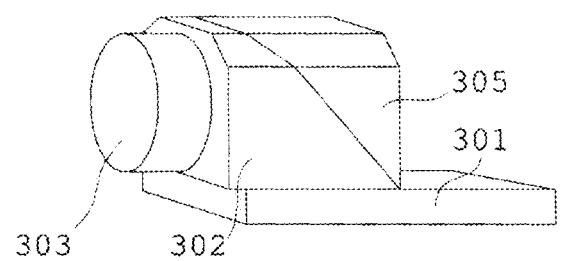
FIG. 1C is a perspective view showing an image sensor unit in FIG. 1B.
Figure 1D:
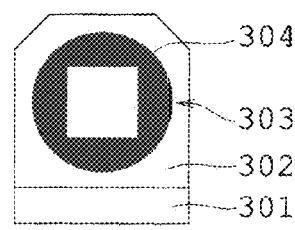
FIG. 1D is a view showing the image sensor unit viewed from the object side in FIG. 1B.
Figure 1E:
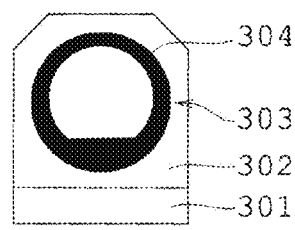
FIG. 1E is a view showing the image sensor unit of a different aperture shape of a flare stop, viewed from the object side.
Figure 1F:
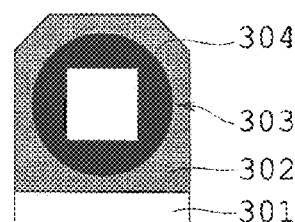
FIG. 1F is a view showing the image sensor unit of a different aperture shape of a flare stop on the entrance surface of a prism, viewed from the object side.
Figure 1G:
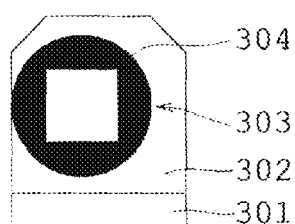
FIG. 1G is a view showing the image sensor unit, viewed from a slightly oblique direction on the object side.

FIG. 1A is a view showing an optical arrangement of the objective optical system for endoscopes in Embodiment 1; FIG. 1B is a view showing a lens frame structure in FIG. 1; FIG. 1C is a perspective view showing an image sensor unit in FIG. 1B; FIG. 1D is a view showing the image sensor unit viewed from the object side in FIG. 1B; FIG. 1E is a view showing the image sensor unit of a different aperture shape of a flare stop, viewed from the object side; FIG. 1F is a view showing the image sensor unit of a different aperture shape of a flare stop on the entrance surface of a prism, viewed from the object side; and FIG. 1G is a view showing the image sensor unit, viewed from a slightly oblique direction on the object side.

A fundamental arrangement of the objective optical system for endoscopes according to the present invention, as shown in FIG. 1, comprises three optical units: a single lens A100, a cemented lens B200, and an image sensor unit C300.

In general, it is desirable that a mechanical part, such as a spacer, used inside the lens frame is eliminated as far as possible because its fabrication and assembly become increasingly difficult in accordance with a micro miniature design of the optical system. In addition, since the image sensor unit needs a long back focus, a power distribution of retrofocus type is required for a wide-angle objective optical system for endoscopes. As a result, in the present invention, optical units excluding the image sensor unit are limited to two optical units of a single lens and a cemented lens so as to attempt the elimination of the mechanical part and to make the power arrangement of retrofocus type with the single lens A100 as a negative power and the cemented lens B200 as a positive power. The single lens A100 is also used as a sealed glass of the outer surface of the distal end of the endoscope and thus is constructed with a single lens alone without using a cemented lens, in the first consideration of durability relative to shock, cleaning, disinfection, and sterilization which are more important than optical quality.

The cemented lens B200 needs to provide the positive power at a position sufficiently spaced away from the single lens A100 from the viewpoint of the efficiency of the power distribution of retrofocus type and to have a convex surface at the image-side end. Moreover, in order to ensure an optical plane on which the aperture stop can be placed inside the cemented lens B200, the image-side end is constructed with a plano-convex lens 201 so that an optical part 202 is cemented to the flat surface of the plano-convex lens 201 and an aperture stop 204 is placed proximate to the cemented portion. As an optical design, there is the merit that the aperture stop 204 is located proximate to the flat surface of the plano-convex lens 201 and thereby the convex surface facilitates a concentric configuration and astigmatism is hard to occur even when a strong power is imparted to the convex surface. The aperture stop 204 is provided with a metallic light-blocking film or black paint is applied to the flat surface of the side of either the optical part 202 or the plano-convex lens 201 and this surface is isolated from the outside atmosphere by an optical cementation. This structure, in contrast with the case where the aperture stop is independently constructed with a mechanical part such as a metallic thin plate, has the following merits. Specifically, the cemented lens B200 and a front frame 501 are cemented on assembly, but the aperture stop 204 is sealed by the optical cementation and hence an adhesive for fixing the frame does not penetrate into the region of the aperture stop. In addition, since the metallic light-blocking film or the black paint causes the stop of less thickness than several μ meters to be formed, diffraction flare light from the aperture end of the stop can be reduced.

Furthermore, the lens frame structure shown in FIG. 1B is based on the premise that the lens frame is separated into two parts, a front frame unit and a rear frame unit. The assembly of the front frame unit is attained by setting up a thin plate flare stop 502 in a front frame 501 and by soldering or watertight-cementing the outside of the single lens A100 to the inside of the front frame 501. Next, the cemented lens B200 is set up in the front frame 501 from the image side and its outside is cemented.

By the above procedure, the single lens A100 and the cemented lens B200 can be stably held in the front frame unit. Also, the thin plate flare plate 502 combines the role of a flare stop cutting off unwanted light from the outside of the visual field with the role of a spacer between the single lens A100 and the cemented lens B200. The thin plate flare stop 502 need not be unreasonably eliminated because its fabrication and assembly are facilitated without placing a structural restriction in particular.

The rear lens unit can be assembled by cementing the periphery of the optical part 303 to a rear frame 503 and hence an image pickup unit of a structure to be described later can be stably held. The front frame 501 and the rear frame 503 have fitting portions. By moving the fitting portions along the optical axis, spacing between the cemented lens B200 and the image sensor unit C300 can be changed to make a focus adjustment. Further, by cementing the fitting portions, the front frame unit and the rear frame unit can be integrated to complete the image pickup unit.

Subsequently, reference is made to the image sensor unit C300 which is the base of the structure of the image pickup surface parallel placement. To the image pickup surface of the solid-state image sensor 301, the exit surface of a path bending prism 302 bending the optical axis perpendicularly is optically cemented, and plays the role of a seal glass protecting the image pickup surface of the solid-state image sensor 301. In addition, to the entrance surface of the path bending prism 302, the optical part 303 is optically cemented, and also serves to improve the holding property of the image sensor unit C300. In a micro miniature lens frame, it is desirable to fit a circular optical part into a cylindrical inside diameter fabrication section to hold the optical part because mechanical accuracy and holding stability are high. In contrast to this, the path bending prism 302 and the solid-state image sensor 301 have shapes such that their peripheries are hard to be held, and thus it is undesirable that they are held directly by the lens frame. As shown in FIG. 1C, therefore, the optical part 303 in which at least a part of its periphery includes a circular surface is positioned and cemented to the entrance surface of the path bending prism 302 so that, as shown in FIG. 1B, the optical part 303 is inserted in, and fixed to, the rear frame 503 and thereby the image sensor unit C300 can be secured to the lens frame with a high degree of accuracy. In this way, the objective optical system for endoscopes is designed so that at least one optical part is provided on the object side of the path bending prism 302 and thereby the holding property of the image sensor unit C300 relative to the lens frame is increased.

As mentioned above, the cemented lens B200 and the image sensor unit C300 have extremely important roles in order to improve the mounting of the micro miniature lens frame, and a plurality of optical parts are optically cemented to thereby realize a plurality of functions. For example, in the cemented lens B 200, the function of the aperture stop of high quality is realized in combination with the optical part 202, while in the image sensor unit C300, the improvement of the holding property of the lens frame is brought about by including the optical part 303. As for the rest, there are demands of various functions and/or quality according to a product specification on the image pickup unit of the endoscope. These are, for example, 1) the elimination of near-infrared light by a near-infrared absorption filter in which ghost is hard to occur, 2) the accommodation of laser treatment by the reflective coating of laser light for treatment, 3) the attenuation of guide light from a laser device for treatment, and 4) a reduction in flare.

The near-infrared absorption filter and the reflective coating of the laser light for treatment must be provided to an optical system itself. In the structure of the present invention, they must be provided in the cemented lens B200 or the image sensor unit C300. For the reduction in flare, it is necessary to consider the mounting of a flare stop in the image sensor unit C300 or to the boundary between the single lens A100 and the cemented lens B200. Ideally, when it is possible that a lens is made of a near-infrared absorption filter material of high refractive index, a stop of a high light-blocking property which can be positioned with a high degree of accuracy is formed on the lens, and the reflective coating of the laser light for treatment is applied to the lens, the design becomes easy. With present technology, however, such an optical part is difficult in fabrication. For example, an aperture formation by etching after the evaporation of a metallic light-blocking film is known as high-precision stop formation technology which has a high light-blocking property, but a high-density infrared light absorbing material withstanding acid corrosion of etching is not found at present. In this way, although the need that many functions are put together in one optical part is high, this cannot be easily put to practical use by the restriction of fabrication technology.

In the present invention, therefore, Conditions (1) and (2) are set on the basis of the fact that a composite function required is dispersed and distributed to a plurality of optical parts so that they can be fabricated, and the lens frame is favorably mounted. Condition (1) determines a favorable thickness range of the cemented lens B200. If the value of $T_B/f$ is below the lower limit in Condition (1), the thickness of the cemented lens B200 becomes too small, which is unfavorable at the following points:

Handling with tweezers on assembly becomes difficult.

The length of fit with the frame is reduced and the optical part in the frame is liable to incline and impairs stability.

When the frame is cemented to the periphery of the optical part, the adhesive is liable to overflow onto the object-side optical surface, and in this case, it is hard to notice the overflow because of the inside of the frame.

In the performance of the composite function, great restriction is placed on the division of the optical element. For example, when the optical element is divided into a plurality of parts, the thickness of each part becomes too small, which causes trouble to handling in part fabrication and optical cementation.

If the value of $T_B/f$ is beyond the upper limit in Condition (1), the thickness of the cemented lens B200 becomes too large, which is unfavorable at the following points:

- The distance between the negative lens A100 and the cemented lens B200 becomes so long that a ray height at the negative lens A100 or the cemented lens B200 increases and its outside diameter enlarges.
- The influence of the inclination of the cemented lens B200 on cementation becomes pronounced and makes the insertion of the cemented lens B200 into the frame 501 difficult. To improve this, it is necessary to set a tolerance so that the outside diameter of each of the parts constituting the cemented lens B200 is practically reduced. As a result, decentration in the frame is increased.

Also, the most desirable range of $T_B/f$ is as shown in the following condition:

$$2.2 < T_B/f < 2.8 \quad (1')$$

Condition (2) defines a favorable thickness range of the image sensor unit C300. If the value of $T_C/f$ is below the lower limit in Condition (2), the optical path length of the image sensor unit C300 becomes short to cause one of the following defects, which is unfavorable:

- In FIG. 1B, the front-side length of the reflecting surface of the path bending prism 302 is insufficient and the solid-state image sensor 301 becomes liable to abut on the rear frame 503 because of various fabrication errors. When this portion abuts, stress is produced by thermal expansion or contraction on a temperature change to develop the defect that an optically cemented portion comes off.
- The optical part 303 becomes too thin and it becomes difficult to handle the image sensor unit C300 itself on optical cementation or to stably hold the unit because the length of fit with the rear frame 503 is insufficient.

If in Condition (2) the value of $T_C/f$ is beyond the upper limit, the optical path length of the image sensor unit C300 becomes too long and a defect is caused in accordance with an increase of the back focus, which is unfavorable. In the power distribution of the present invention, when the ray height of the single lens A100 is repressed, curvature of field is liable to be overcorrected, and when the field angle is maintained and the back focus is increased, it is necessary to increase the value of $T_C/f$ while weakening the positive power of the cemented lens B200. This change strengthens the tendency of overcorrection of the curvature of field and brings about the same defect as in the case where the upper limit of Condition (1) is passed.

Also, the most desirable range of $T_C/f$ is as shown in the following condition:

$$2.6 < T_C/f < 3.2 \quad (2')$$

In the discussion so far, reference has been made to the respect that assembly is chiefly taken into account in relation of the first aspect of the present invention. Subsequently, in addition to this, reference is made to the respect relative to the second aspect of the present invention considering the improvement of workability and cost of the optical part.

The difference in structure between the first and second aspects of the present invention is that the distribution of the optical power is limited to two surfaces, the concave surface of the single lens A100 and the convex surface of the plano-convex lens which is the cemented lens B200.

In the present invention, a lens with an outside diameter of 1 mm or less is assumed in order to realize a sectional area of 1 mm$^2$ or less, and it is very difficult that such extremely small lenses are used to fabricate biconvex, biconcave, and meniscus lenses, each having powers on both surfaces, which causes an increase in cost. In the second aspect of the present invention, therefore, with the exception of two surfaces essential for the realization of retrofocus power distribution, lenses are provided with only flat surfaces to thereby attempt the cost reduction of optical parts. Specifically, as shown in FIG. 1A, the optical parts 202, 203, and 303 are constructed with flat surfaces, with the exception of the single lens A100 and the optical part 201.

The third aspect of the present invention defines favorable conditions common to the structures of the first and second aspects of the present invention. That is, it is desirable that the single lens A100 and the cemented lens B200 is constructed to satisfy Conditions (3) and (6). These conditions are described below.

Condition (3) is first described. The single lens A100 needs the role of a window material of an endoscope outside surface and thus its row material is generally limited to a crystal material of high refractive index which is good in mechanical durability or a lanthanoide optical glass. In particular, sapphire has the maximum durability as a generally used optical widow material and thus the single lens A100 is preferably constructed of a raw material with the refractive index $n_{AL}$ equivalent to or higher than that of sapphire from the viewpoint of securing durability. In addition, the radius of curvature of the concave surface can be increased as the refractive index $n_{AL}$ becomes high, and the workability of the concave surface is excellent. Although the raw material of high mechanical durability generally has difficulty in workability, production time can be reduced with increasing radius of curvature of the concave surface and with decreasing depth and the cost reduction is attained. Moreover, with increasing refractive index, center and edge lens thicknesses can be increased without raising the ray height, and hence workability, handling on assembly, and watertightness can be improved. When Condition (3) is not satisfied, the refractive index $n_{AL}$ is too low, the radius of curvature of the concave surface becomes small, and the workability is impaired. In addition, the center and edge lens thicknesses are decreased in order to reduce the ray height, and thereby the deterioration of assembly and watertightness is caused, which is unfavorable.

Next, Condition (4) is explained. Since the convex surface of the plano-convex lens which is the cemented lens B200 shares the most of the positive power of the entire objective optical system, the radius of curvature $R_{BL}$ is liable to become very small. As a result, if the refractive index $n_{BL}$ fails to satisfy Condition (4), the radius of curvature $R_{BL}$ becomes smaller than is necessary, and the deterioration of workability and the degradation of imaging performance by decentration are brought about, which is unfavorable.

Condition (5) defines a favorable condition of the retrofocus power ratio. That is, if the value of $|f_{BL}/f_{AL}|$ is below the lower limit, the focal length $f_{BL}$ is too relatively small and it becomes difficult to ensure the back focus, which is unfavorable. If the value of $|f_{BL}/f_{AL}|$ is beyond the upper limit, the negative power of the single lens A100 becomes too relatively strong and curvature of field is overcorrected, which is unfavorable.

Condition (6) determines a favorable condition of the plano-convex lens which is the cemented lens B200. Specifically, the aperture stop is placed proximate to the flat surface of the plano-convex lens, and thus if $|T_{BL}/R_{BL}|=1$, a concentric state where a chief ray is not refracted at the convex surface is brought about and astigmatism is not produced at the convex surface. At $|T_{BL}/R_{BL}|=1$, however, the thickness $T_{BL}$ is relatively large and thus the ray height at the convex surface increases. Moreover, the ray height at the image sensor unit C300 also increases. When $|T_{BL}/R_{BL}|<1$, the ray height is reduced, but astigmatism increases in accordance with the deterioration of concentricity. Hence, it is desirable to satisfy the lower limit of Condition (6) from the viewpoint of securing the concentricity and to satisfy the upper limit of Condition (6) from the viewpoint of preventing an increase of the ray height. If the value of $|T_{BL}/R_{BL}|$ is below the lower limit, astigmatism increases, while, beyond the upper limit, the ray heights at the convex surface and the image sensor unit C300 are increased, which is unfavorable.

Subsequently, reference is made to the fourth aspect of the present invention. In the objective optical system for endoscopes according to the present invention, provision for flare inherent in the image pickup surface parallel placement is also important, and it is desirable that the single lens A100 and the cemented lens B200 have a flare stop between them and the image sensor unit C300 is provided with another flare stop proximate to the cementing portion of the entrance surface of the path bending prism 302. The flare stop interposed between the single lens A100 and the cemented lens B200 corresponds to the flare stop 502 in FIG. 1B. The flare stop on the side of the image sensor unit C300 corresponds to a flare stop 304 in FIG. 1D, and in FIG. 1D, the flare stop 304 with a rectangular aperture is formed on the cementing-surface side of the optical part 303. The aperture of the flare stop 304 needs to chiefly eliminate an unwanted light beam on the side close to the solid-state image sensor 301. It is good practice that at least the aperture on the side of the solid-state image sensor 301 is formed in a straight line, and for example, as shown in FIG. 1E, a combination of a circle with a straight line may be used. The flare stop 304 is provided with a metallic light-blocking film or black paint. This flare stop may be provided on the entrance surface of the path bending prism, and when the image sensor unit C300 having the rectangular aperture on the entrance surface of the path bending prism is viewed from the object side, it is as shown in FIG. 1F. In the absence of the flare stop 304, a flare optical path exists along which extraneous light incident from above the optical axis on the object side enters directly the image pickup surface without passing the reflecting surface of the path bending prism 302, and flare inherent in the image pickup surface parallel placement is produced.

This flare, which does not involve the attenuation of light by scattering, is very strong in intensity when produced, and considerably impairs the image quality. Furthermore, in order to secure the provision for flare, it is more desirable that the extraneous light is previously eliminated on the front side of the aperture stop 204, and the flare stop 502 contributes to the elimination of the extraneous light on the entrance side. Also, there is no need to limit the flare stop interposed between the single lens A 100 and the cemented lens B200 to a thin plate stop. For example, the most object-side surface of the cemented lens B200 may be provided with the metallic light-blocking film or black paint, or the black paint may be applied to the outside of the effective diameter of the concave surface of the single lens A100 to block light. By the combination of these two flare stops arranged before and behind the aperture stop provided between them, the flare incident directly on the image pickup surface can be obviated. The placement of the flare stop in the image sensor unit C300 for this purpose is optimized in the proximity of the cementing portion between the optical part 303 and the path bending prism 302, in consideration of the flare optical path. In the case where the flare stop is placed on the exit surface of the path bending prism, it is too close to the image pickup surface to remove the flare light incident on the effective image pickup area. Where the flare stop is placed on the object side of the optical part 303, it is too separate from the image pickup surface to completely remove the extraneous light beam with the flare stop taking an effective area as the aperture because the extraneous light beam is superimposed with an effective light beam. Also, the combination of the two flare stops is effective for a reduction of flare other than that incident directly on the image pickup surface.

Next, reference is made to the fifth aspect of the present invention. One favorable structural example where the composite function is imparted to the cemented lens B200 is that the cemented lens B200 comprises, in order from the object side, an optical flat plate made from a near-infrared light absorbing material, an optical flat plate formed with an aperture stop of a metallic light-blocking film on a surface cemented to the plano-convex lens, and the plano-convex lens. The first embodiment also corresponds to this arrangement so that the optical part 203 shown in FIG. 1A is the optical flat plate made from the near-infrared light absorbing material and the optical part 202 is the optical flat plate formed with the aperture stop 204 of the metallic light-blocking film. By such an arrangement, the near-infrared light absorbing function can be imparted to the cemented lens B200 and the near-infrared light unnecessary for the entire objective optical system can be eliminated without producing ghost as in an interference film.

The lens function, the aperture stop function, and the near-infrared light absorbing function are shared among three optical parts and thereby the fabrication of each of the optical parts is facilitated. When the aperture stop 204 of the optical part 202 is formed as the metallic light-blocking film, the aperture is provided by etching, but the material of this part is not restricted by another function and thus glass withstanding acid corrosion of etching can be employed. Since the optical part 202 is the flat plate, a large-sized substrate having many openings of aperture stops is prepared beforehand and many aperture stops are obtained in such a way that the substrate is cut to set centering, with the opening as a reference. This is suitable for mass production. In this way, when the near-infrared light absorbing function is imparted to the side of the cemented lens B200, it need not be imparted to the side of the image sensor unit C300 and the number of degrees of structural freedom can be increased.

For example, in the formation of the flare stop relative to the optical part 303 of FIG. 1D, the glass withstanding the acid corrosion of etching can be employed and hence it becomes possible that the metallic light-blocking film is fabricated by etching as in the aperture stop 204. In addition, when the cutoff of laser light for treatment is required, it is possible to apply the reflective coating of the laser light for treatment to the object-side surface of the optical part made from the near-infrared light absorbing material. In this case, when the optical part made from the near-infrared light absorbing material is designed so that a flat plate can be used, it becomes possible that many coats are obtained by cutting from a large-sized substrate applying the reflective coating of the laser light for treatment, and a rise in cost by the addition of the function can be controlled.

Next, a description is given of the sixth aspect of the present invention. One of the favorable structures of the image sensor unit C300 is that the path bending prism has an entrance surface, a reflecting surface, and an exit surface to satisfy Conditions (7) and (8). Condition (7) is related to quality where the image pickup surface of the solid-state image sensor is optically cemented to the path bending prism. In the exit surface of the path bending prism cemented to the image pickup surface, the tolerance of surface defect, such as a flaw, must be kept to a degree approximate to the pixel pitch of the solid-state image sensor and as a result, the path bending prism is liable to increase in cost. However, since the difference in refractive index between an optical adhesive and the path bending prism is decreased and thereby the tolerance of the surface defect of the exit surface is moderated, the cost of the path bending prism can be cut. The refractive index of an ordinary optical adhesive is 1.5-1.57, and when the refractive index $n_{CP}$ is assumed to be less than 1.65, the difference of the refractive index can be guaranteed to 0.15 or less. This is capable of greatly contributing to the moderation of the tolerance of the surface defect.

If the refractive index of the path bending prism is beyond the upper limit of Condition (7), the tolerance of the surface defect of the exit surface becomes severe and the cost of the path bending prism increases, which is undesirable. Since the path bending prism satisfying Condition (7) is low in refractive index, it becomes difficult to use the reflecting surface for total reflection. When the path bending prism is assumed to be 1 mm×1 mm or smaller, it is considerably difficult to maintain a cleaning state of such minute space as to have an electronic part connecting section close by. It is thus desirable that the reflecting surface of the path bending prism is provided with a metallic reflecting film of aluminum or silver which has a high reflectance in the visible region. In addition, it is more desirable that a protecting film, such as $SiO_2$, SiO, or $Al_2O_3$, is provided on the atmosphere side of the metallic reflecting film to prevent oxidation.

Condition (8) shows a favorable limit of the ratio between the optical path lengths before and behind the reflecting surface of the path bending prism. The optical path length $T_{CPR}$ is related directly to the size of a sectional direction and thus must be kept to a minimum by considering the effective image pickup surface with a margin. The optical path length $T_{CPF}$ is equivalent to the optical path length $T_{CPR}$ with respect to the fact of considering the effective image pickup surface with a margin and thus has no problem. However, in order to design the optical system so that the solid-state image sensor 301 does not abut on the rear frame 503 as illustrated in FIG. 1B, it is necessary that the optical path length $T_{CPF}$ is made longer than the optical path length $T_{CPR}$. However, if the optical path length $T_{CPF}$ is too long, the back focus will increase, and hence loads are forced upon the distributed powers of the single lens A100 and the cemented lens B200. When the value of $T_{CPF}/T_{CPR}$ is set to the limit of Condition (8), the balance between the frame structure and the back focus is favorably held on the premise that the compact design and the effective image pickup surface are considered. Below the lower limit of Condition (8), for example, the solid-state image sensor 301 becomes liable to abut on the rear frame 503 and unfavorable problems, such as coming-off of the cemented surface, are caused. Beyond the upper limit, the back focus becomes too long, which is unfavorable.

Next, a description is given of the seventh aspect of the present invention. It is desirable that the image sensor unit C300 includes a reflecting surface protecting member of glass or ceramic having a light transmitting property so that the reflecting surface protecting member is cemented to the reflecting surface of the path bending prism with a light curing-type adhesive. In FIG. 1B, a reflecting surface protecting member 305 is cemented to the reflecting surface of the path bending prism 302. The purpose of the reflecting surface protecting member 305 is that the durability of the reflecting surface is further improved. By depositing a metallic reflecting film and a metallic oxidation protecting film on the reflecting surface, the durability can be secured to some extent with respect to an ambient change. However, in order to prevent the penetration of humidity into the solid-state image sensor 301 and to fix electric wiring, a reflecting-surfaces-side space is sometimes charged with a thermosetting sealing adhesive. In this case, the structure that the sealing adhesive is further superposed on the thin film of the reflecting surface is brought about. At this time, an arrangement of [the glass of the path bending prism—the metallic reflecting film—(the metallic oxidation protecting film)—the sealing adhesive] is made in the proximity of the reflecting surface, but the sealing adhesive is hardened and contracted by heat curing and further causes the problem that the stress is produced after the heat curing due to its large coefficient of thermal expansion.

In such a structure, there is a high possibility that coming-off between the metallic reflecting film and the glass is produced by a temperature change on and after assembly and it becomes difficult to maintain the quality of the reflecting surface for a long period of time. When the reflecting surface protecting member 305 is cemented to the reflecting surface with the light curing-type adhesive made of glass, there are many favorable advantages as follows:

The stress from the sealing adhesive is not imposed directly on the reflecting surface.

In the reflecting surface protecting member made with glass or ceramic, the difference of the coefficient of thermal expansion between the member and the path bending prism is small and a residual stress introduced by the cementation is low because of the cementation by light curing at ordinary ambient temperature.

The reflecting surface of the path bending prism is not exposed, so that the occurrence of chippings by handling can be suppressed.

It is possible to grasp the reflecting surface protecting member of any optical quality on assembly, and handling of the image sensor unit C300 is facilitated.

Next, a description is given of the eighth aspect of the present invention. In a video scope having the channel for treatment, cases sometimes arise in where it is desired to incline the direction of the visual field toward a treatment tool and a laser probe. In the structure of the image sensor unit C300 of the present invention, even when the direction of the visual field of the objective optical system is slightly inclined for an oblique view at an angle of several degrees, it is easy to do so. In the objective optical system of the present invention, when it is slightly inclined for the oblique view, a path bending section becomes longer than a section perpendicular to it (normal to the plane of the page) and thus the channel for treatment runs parallel to the direction perpendicular to the path bending section in order to reduce the diameter of the distal end of the video scope. A desirable structure of this slightly oblique view is that as shown in FIG. 1B, the optical part 303 of the image sensor unit C300 is coaxial with the cemented lens B200 and as shown in FIG. 1G, the image pickup surface of the solid-state image sensor 301 is decentered in the direction perpendicular to the path bending section with respect to the center of the optical part 303 and thereby the visual field is inclined in the direction perpendicular to the path bending section. Also, in this case, there is no need to limit a component only in the direction perpendicular to the path bending section, and the component may be compounded of a decentering component in the direction of the path bending section.

Additionally, reference is made to a specific assembly technique. First, the solid-state image sensor 301 and the path bending prism 305 are cemented in a preset positional relation. A state where these two parts are cemented can accommodate both the direct view and the slightly oblique view of the objective optical system. In the image sensor unit C300 for the direct view, the path bending prism 302 and the optical part 303 are cemented so that the center of the optical part 303 is aligned with that of the effective image pickup surface. In the image sensor unit C300 for the slightly oblique view, the path bending prism 302 and the optical part 303 are cemented so that the center of the optical part 303 is offset by a preset amount with respect to that of the effective image pickup surface. In this way, it is possible to accommodate the direct view and the slightly oblique view by positioning the optical part 303 on cementation and it becomes possible to use common parts between the products of different directions of the visual field. In order to position the flare stop, high accuracy is required in the direction of the path bending section with the light entering directly the image pickup surface, but required accuracy is not high in the direction perpendicular to the path bending section. Hence, even though either the optical part 303 or the path bending prism 302 is provided with the flare stop, they can be used as parts common between the direst view and the slightly oblique view.

Next, a description is given of the ninth and tenth aspects of the present invention. In the video scope in which the laser probe is inserted into the channel to take laser treatment, the halation of an image caused by guide light indicating the position of laser light irradiation to an operator sometimes raises a problem. In the application of ureter lithotripsy, an Ho-YAG laser device is widely used and a laser probe of 1 mm or less is inserted into the channel of a ureter video scope so that a calculus is irradiated with Ho-YAG laser light and is broken. In this case, it is irradiated with light having a center wavelength in the visible region as the guide light through the laser probe. Also, the light source of the guide light is a semiconductor laser or an LED, and a red wavelength band (630-670 nm) is chiefly used. Presently, the automatic light adjustment of the guide light by communication and control functions between the video scope system and the Ho-YAG laser device cannot be made. When the minimum output of the guide light which can be set by the Ho-YAG laser device is too high, some provision for preventing saturation becomes necessary on the video scope system side. In order to prevent the guide light without reducing brightness in an ordinary observation by visible light, a spectral design is required to selectively attenuate the wavelength of the guide light in a proper proportion within the objective optical system.

When an attenuation filter of laser guide light is provided in the objective optical system of the present invention, it is desirable that the filter is placed inside the cemented lens B200 or the image sensor unit C300 to satisfy Condition (9). The value of $\tau_G \cdot P_V^2/F_{NO}^2$ in Condition (9) indicates an evaluation measure of the sensitivity of the guide light. The term $P_V^2$ is in a relation nearly proportional to the sensitivity of the solid-state image sensor and $F_{NO}^2$ is a measure of lens brightness as is well known. By multiplying these values by the transmittance $\tau_G$, the sensitivity relative to the guide light as the image pickup system can be held. If the value of $P_V^2/F_{NO}^2$ is beyond the upper limit, the sensitivity of the image pickup system becomes too high and the halation is discussed as a problem. Below the lower limit, the sensitivity of the image pickup system is too low and the guide light becomes dark, so that the visibility of an irradiation target as a purpose is impaired. When the guide light lies in a green wavelength band located in the middle of the visible region, an interference film filter reflecting only the center wavelength of the guide light and its nearby wavelengths is used as a notch filter in a narrow band in order to avoid the attenuation of ordinary observation light as far as possible. When the guide light lies in a red wavelength band of about 630-670 nm which constitutes the main current at present, a near-infrared light cutoff filter provided for securing color reproducibility can be also used to attenuate the guide light. In this case, it is desirable that the near-infrared light cutoff filter is constructed of the near-infrared light absorbing material and is placed inside the cemented lens B200 or the image sensor unit C300 to satisfy Condition (10). In Condition (10), the transmittance $\tau_G$ of Condition (9) is replaced by the transmittance $\tau_{650}$ set to 650 nm as a wavelength representative of the red wavelength band, and there is no change to a desirable limit. The near-infrared light absorbing material is used and thereby ghost liable to cause the problem in the interference film can be obviated.

Numerical data of individual embodiments will be explained below. First, reference is made to specifications common to individual embodiments, data lists, and definitions of reference symbols used to simplify the detailed description.

Specifications Common to Individual Embodiments
  Object distance=3.8 mm
  Image height=0.28 mm
  Vertical pixel pitch $P_V$ of the solid-state image sensor=2.1 μm
  Internal transmittance $\tau_{650}$ of light with a wavelength of 650 nm by the near-infrared light absorbing material=31.7%

List of Embodiments

| Embodiment | FOV | $F_{NO}$ | f | $n_{AL}$ | $n_{BL}$ | $n_{CP}$ |
|---|---|---|---|---|---|---|
| 1 | 79.2° | 5.03 | 0.428 | 1.7682 | 1.883 | 1.51633 |
| 2 | 76.7° | 5.1 | 0.441 | 1.883 | 1.883 | 1.51633 |
| 3 | 80.4° | 5.01 | 0.425 | 1.7682 | 1.883 | 1.51633 |
| 4 | 80.2° | 4.93 | 0.421 | 1.7682 | 1.883 | 1.51633 |
| 5 | 79.5° | 4.97 | 0.426 | 1.7682 | 1.883 | 1.51633 |

| Embodiment | $T_B/f$ | $T_C/f$ | $T_{CPF}/T_{CPR}$ | $|f_{BL}/f_{AL}|$ | $|T_{BL}/R_{BL}|$ | $\tau_{650} \cdot P_V^2 / F_{NO}^2$ |
|---|---|---|---|---|---|---|
| 1 | 2.41 | 2.92 | 1.43 | 1.27 | 0.78 | 5.53 |
| 2 | 2.34 | 2.83 | 1.43 | 1.28 | 0.78 | 5.37 |
| 3 | 2.33 | 2.94 | 1.43 | 1.27 | 0.78 | 5.57 |
| 4 | 2.45 | 2.97 | 1.43 | 1.39 | 0.71 | 5.75 |
| 5 | 1.76 | 2.93 | 1.43 | 1.27 | 0.78 | 5.66 |

Supplemental Explanation of Reference Symbols
  SN: Surface number
  R: Radius of curvature (mm)
  D: Face-to-face distance (mm)
  Nd: Refractive index (d line)
  vd: Abbe's number (d line)
  UN: Name of the lens unit
  LD: Lens outside diameter (mm)
  AD: Aperture diameter (mm)
  (AS): Aperture stop
  (FS): Flare stop
  (IP): Image plane

HOYA C. O. CORP.: HOYA CANDEO OPTRONICS CORPORATION

Embodiment 1 (FIG. 1)

| SN | R | D | Nd | vd | LD | AD | Supplement to glass material |
|---|---|---|---|---|---|---|---|
| 1 | ∞ | 0.27 | 1.76820 | 71.79 | 0.90 | | Sapphire |
| 2 | 0.35 | 0.11 | | | | | |
| 3(FS) | ∞ | 0.93 | | | | 0.31 | |
| 4 | ∞ | 0.40 | 1.52134 | 74.98 | 0.50 | | CD5000/HOYA C.O. CORP. |
| 5 | ∞ | 0.23 | 1.88300 | 40.76 | 0.50 | | Optical glass |
| 6(AS) | ∞ | 0.40 | 1.88300 | 40.76 | 0.50 | 0.19 | Optical glass |
| 7 | −0.51 | 0.29 | | | | | |
| 8 | ∞ | 0.40 | 1.51633 | 64.14 | 0.65 | | Optical glass |
| 9(FS) | ∞ | 0.50 | 1.51633 | 64.14 | | | Optical glass |
| 10 | ∞ | 0.35 | 1.51633 | 64.14 | | | Optical glass |
| 11(IP) | ∞ | | | | | | |

The structure of the lens data is supplemented by using FIGS. 1A-1G. The single lens A100 includes a plano-concave lens of sapphire material and is fixed to the front frame 501 by cementation or soldering, but soldering is essentially desirable. The edge thickness of the single lens A100 is as small as 0.38 mm, and to fix the lens to the front frame 501 for water seal, the length of fit is extremely short. In the cementation structure, therefore, there is the possibility that the adhesive is deteriorated by disinfection and sterilization and thereby haze is produced by the degradation of a watertight property and the internal penetration of humidity. Hence, it is the best practice that the single lens A100 is fixed by soldering which is higher in durability than the adhesive. In addition, sapphire which has extremely high strength is used for the single lens A100 in consideration of a stress load caused to the single lens A100 on soldering.

The cemented lens B200 includes the plano-convex lens 201, the flat-plate-shaped optical part 202 in which the aperture stop 204 is formed on its plano-convex-lens-201-side surface, and the flat-plate-shaped optical part 203 made from the near-infrared light absorbing material (CD5000/Hoya C. O. CORP.) so that these three parts has the same outside diameter and are optically cemented by making the outside diameters to coincide. In the aperture stop 204, since the reflectance is very high in chrome alone as the metallic light-blocking film, metallic oxidation films are provided before and behind the chrome to reduce the reflectance as a multilayer film and to obviate ghost. The formation of the multilayer film is performed by vacuum evaporation or sputtering. The formation of the stop aperture is performed by the procedure of photoresist application/mask exposure/resist removal/etching by an acid solution. The aperture stop produced by this method has the strength enough to withstand the cleaning and cementation on assembly. For the optical part 202, an optical glass which can withstand etching and has high acid resistance is used. As a method of forming the stop other than the metallic light-blocking film, a method of forming the stop with black ink directly outside the aperture by an ink jet technique may be used. Detrimental near-infrared light is attenuated by the near-infrared light absorbing material of the optical part 203 to secure color reproducibility. In the objective optical system of this embodiment, it is assumed that the treatment can be accommodated by the Ho-YAG laser device, and an interference film reflecting Nd-YAG laser light is provided on the object-side surface of the optical part 203. In this connection, the Ho-YAG laser device sometimes combines the function of emitting not only the Ho-YAG laser light (2.06 μm), but also the Nd-YAG laser light (1.06 μm), which is often used in the application other than that of lithotripsy.

The image sensor unit C300 includes the optical part 303 which is a circular flat plate and is formed with the flare stop 304 on one surface, the path bending prism 302, the solid-state image sensor 301, and the reflecting surface protecting member 305 so that these are integrated by the optical cementation. As an example, the cementation is performed by the following procedure:

The path bending prism 302 and the reflecting surface protecting member 305 are cemented so that the reflecting-surface-side edge of the path bending prism 302 liable to produce chippings is protected and the area which can be held is increased.

The path bending prism 302 and the solid-state image sensor 301 are cemented.

The optical part 303 and the path bending prism 302 are cemented.

The flare stop 304 of the optical part 303, like the aperture stop 204, is formed by the metallic light-blocking film taking chrome as a base and etching. For the optical part 303, an optical glass which can withstand etching and has high acid resistance is used. In the path bending prism 302, it is desirable that the ordinary optical glass is assumed to describe the lens data and actually, a high-quality glass specified for the seal of the solid-state image sensor is used. A distance between the ninth surface and the tenth surface corresponds to the optical path length $T_{CPF}$ and a distance between the tenth surface and the eleventh surface to the optical path length $T_{CPR}$.

Figures 2A, 2B, 2C:
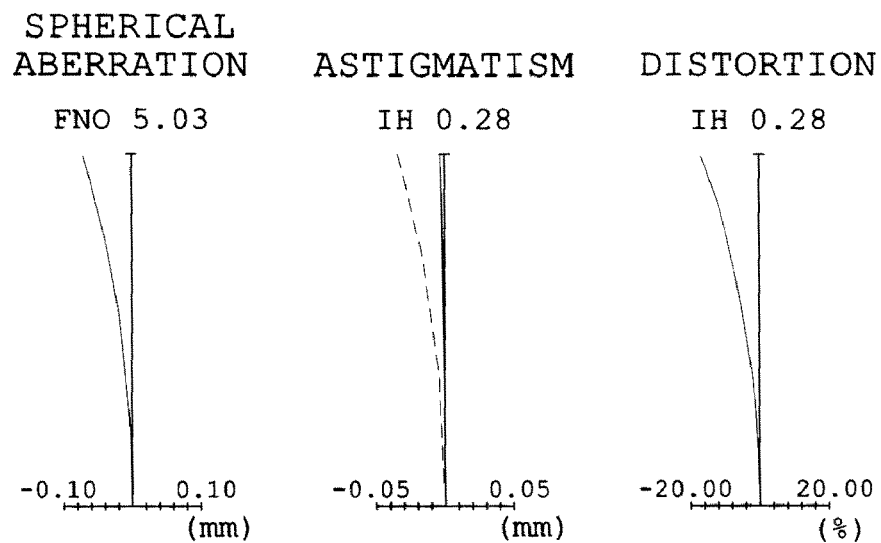
FIGS. 2A, 2B, and 2C are diagrams showing aberration characteristics in Embodiment 1.

Also, the aberration characteristics of this embodiment are as shown in FIGS. 2A-2C.

Figure 3:
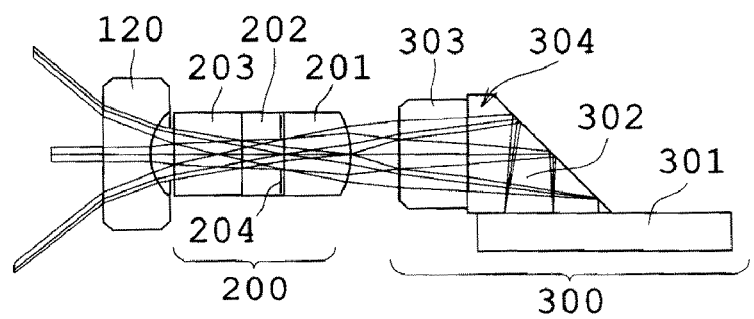
FIG. 3 is a view showing an optical arrangement of the objective optical system for endoscopes in Embodiment 2.

Embodiment 2 (FIG. 3)

| SN | R | D | Nd | vd | LD | AD | Supplement to glass material |
|---|---|---|---|---|---|---|---|
| 1 | ∞ | 0.29 | 1.88300 | 40.76 | 0.90 | | Optical glass |
| 2 | 0.4 | 0.09 | | | | | |
| 3(FS) | ∞ | 0.03 | | | | 0.31 | |
| 4 | ∞ | 0.40 | 1.52134 | 74.98 | 0.50 | | CD5000/HOYA C.O. CORP. |
| 5 | ∞ | 0.23 | 1.88300 | 40.76 | 0.50 | | Optical glass |
| 6(AS) | ∞ | 0.40 | 1.88300 | 40.76 | 0.50 | 0.19 | Optical glass |
| 7 | −0.51 | 0.31 | | | | | |
| 8 | ∞ | 0.40 | 1.51633 | 64.14 | 0.65 | | Optical glass |
| 9(FS) | ∞ | 0.50 | 1.51633 | 64.14 | | | Optical glass |
| 10 | ∞ | 0.35 | 1.51633 | 64.14 | | | Optical glass |
| 11(IP) | ∞ | | | | | | |

A main difference with Embodiment 1 is that a single lens A120 is constructed of ordinary optical glass. Sapphire is very hard and is inferior to the ordinary optical glass in workability and cost. Hence, when the durability is allowable including the method of fixing the lens to the frame, it is possible to use not the sapphire, but the optical glass. In this case also, the method of fixing the lens to the front frame is applied by selecting either cementation or soldering.

Figures 4A, 4B, 4C:
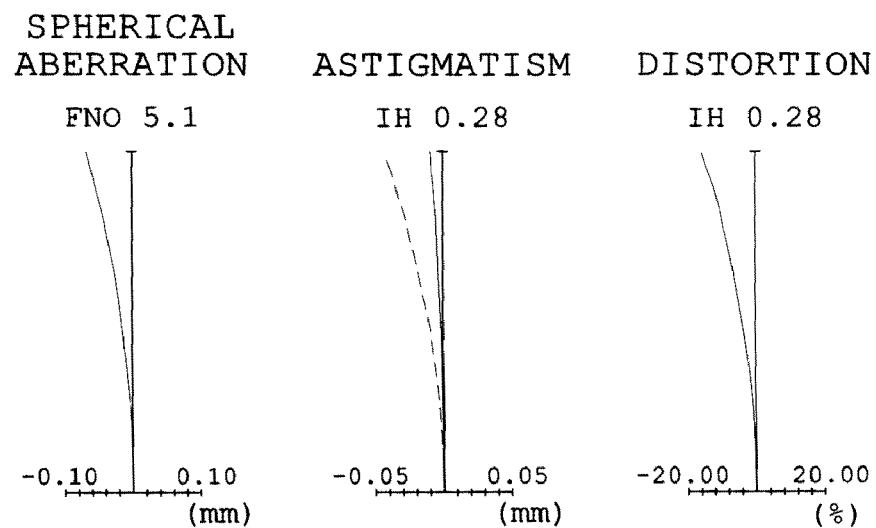
FIGS. 4A, 4B, and 4C are diagrams showing aberration characteristics in Embodiment 2.

Also, the aberration characteristics of this embodiment are as shown in FIGS. 4A-4C.

Figure 5:
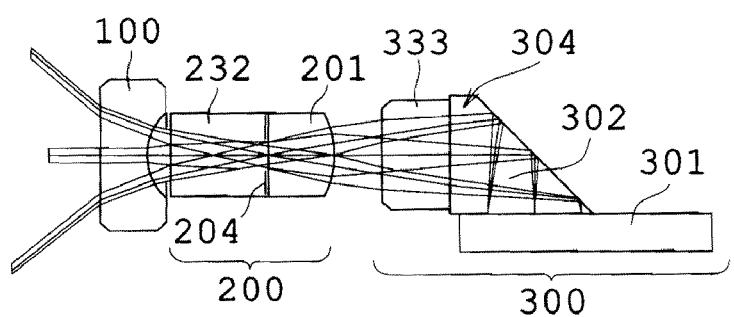
FIG. 5 is a view showing an optical arrangement of the objective optical system for endoscopes in Embodiment 3.

Embodiment 3 (FIG. 5)

| SN | R | D | Nd | vd | LD | AD | Supplement to glass material |
|---|---|---|---|---|---|---|---|
| 1 | ∞ | 0.27 | 1.7682 | 71.79 | 0.90 | | Sapphire |
| 2 | 0.35 | 0.11 | | | | | |
| 3(FS) | ∞ | 0.03 | | | | 0.31 | |
| 4 | ∞ | 0.59 | 1.51633 | 64.14 | 0.50 | | Optical glass |
| 5(AS) | ∞ | 0.40 | 1.88300 | 40.76 | 0.50 | 0.19 | Optical glass |
| 6 | −0.51 | 0.28 | | | | | |
| 7 | ∞ | 0.40 | 1.52134 | 74.98 | 0.65 | | CD5000/HOYA C.O. CORP. |
| 8(FS) | ∞ | 0.50 | 1.51633 | 64.14 | | | Optical glass |
| 9 | ∞ | 0.35 | 1.51633 | 64.14 | | | Optical glass |
| 10(IP) | ∞ | | | | | | |

A main difference with Embodiments 1 and 2 is that the image sensor unit C300 is provided with the near-infrared light absorbing material and the cemented lens B200 is constructed with two parts, each of which does not include the near-infrared absorbing material. The cemented lens B200 includes the plano-convex lens 201 and a flat-plate-shaped optical part 232 in which the aperture stop 204 is formed on its plano-convex-lens-201-side surface. An optical part 333 of the image sensor unit C300 is a flat plate made from the near-infrared light absorbing material (CD5000/HOYA C. O. CORP.) When the flare stop 304 of the optical part 333 is formed, a printing technique, such as an ink jet method or pad printing, is used because the acid resistance of the material is low.

Figures 6A, 6B, 6C:
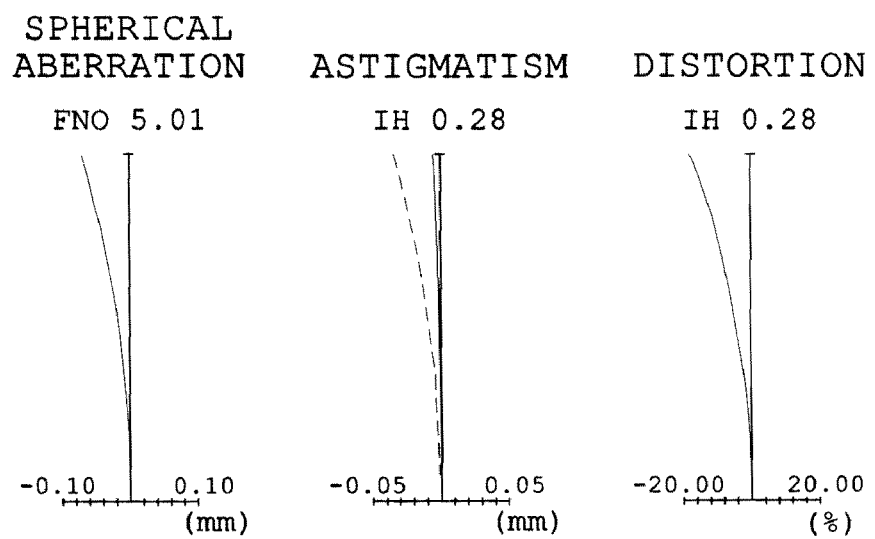
FIGS. 6A, 6B, and 6C are diagrams showing aberration characteristics in Embodiment 3.

Also, the aberration characteristics of this embodiment are as shown in FIGS. 6A-6C.

Figure 7:
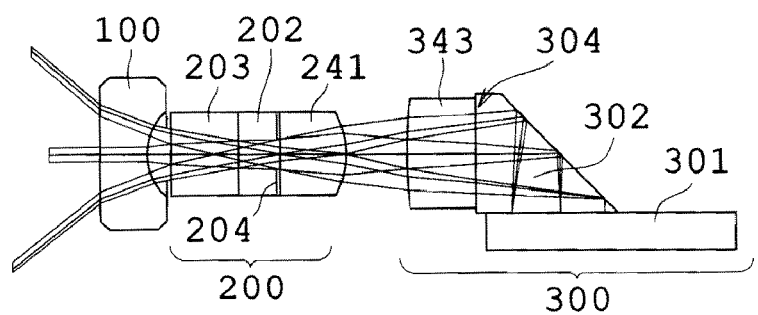
FIG. 7 is a view showing an optical arrangement of the objective optical system for endoscopes in Embodiment 4.

Embodiment 4 (FIG. 7)

| SN | R | D | Nd | vd | LD | AD | Supplement to glass material |
|---|---|---|---|---|---|---|---|
| 1 | ∞ | 0.27 | 1.76820 | 71.79 | 0.90 | | Sapphire |
| 2 | 0.35 | 0.11 | | | | | |
| 3(FS) | ∞ | 0.03 | | | | 0.31 | |
| 4 | ∞ | 0.40 | 1.52134 | 74.98 | 0.50 | | CD5000/HOYA C.O. CORP. |
| 5 | ∞ | 0.23 | 1.88300 | 40.76 | 0.50 | | Optical glass |
| 6(AS) | ∞ | 0.40 | 1.88300 | 40.76 | 0.50 | 0.19 | Optical glass |
| 7 | −0.56 | 0.35 | | | | | |
| 8 | 2.28 | 0.40 | 1.51633 | 64.14 | 0.65 | | Optical glass |
| 9(FS) | ∞ | 0.50 | 1.51633 | 64.14 | | | Optical glass |
| 10 | ∞ | 0.35 | 1.51633 | 64.14 | | | Optical glass |
| 11(IP) | ∞ | | | | | | |

A main difference with Embodiment 1 most similar in arrangement to this embodiment is that an optical part 343 of the image sensor unit C300 is a plano-convex lens with a convex surface facing the object side and the power of a plano-convex lens 241 of the cemented lens B200 is moderated. In the arrangement of the present invention, the positive power is concentrated in the plano-convex lens of the cemented lens B200 and thus a decentering sensibility at this convex surface is high. In contrast to this, Embodiment 4 allows the positive power to be shared with the image sensor unit C300, and hence the decentering sensibility can be lessened in the cemented lens B200. In the case where the convex surface of the plano-convex lens of the cemented lens B200 is decentered by 0.01 mm, the image decentration and the fluctuation of longitudinal spherical aberration from a design state are shown below.

| | Image decetration (mm) | Longitudinal spherical aberration fluctuation (mm) |
|---|---|---|
| Embodiment 1 | 0.02 | 0.025 |
| Embodiment 4 | 0.018 | 0.017 |

As shown in the above data, the positive power is also imparted to the side of the image sensor unit C300 and thereby the decentering sensibility of the plano-convex lens of the cemented lens B200 can be lessened.

Figures 8A, 8B, 8C:
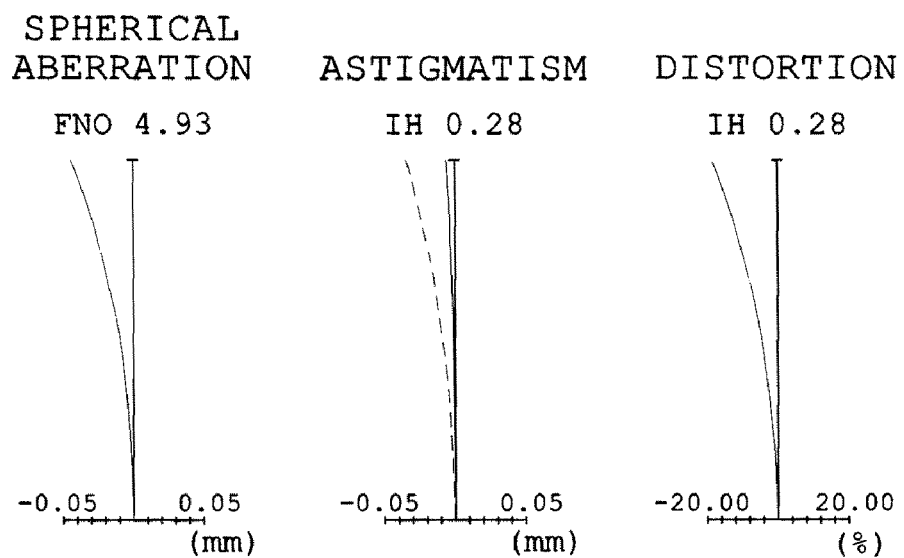
FIGS. 8A, 8B, and 8C are diagrams showing aberration characteristics in Embodiment 4.

Also, the aberration characteristics of this embodiment are as shown in FIGS. 8A-8C.

Figure 9:
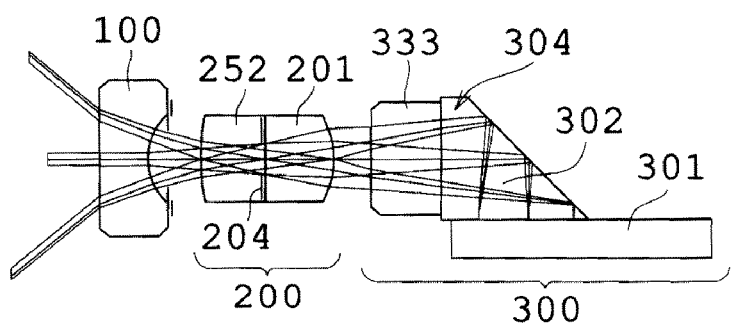
FIG. 9 is a view showing an optical arrangement of the objective optical system for endoscopes in Embodiment 5.

Embodiment 5 (FIG. 9)

| SN | R | D | Nd | vd | LD | AD | Supplement to glass material |
|---|---|---|---|---|---|---|---|
| 1 | ∞ | 0.27 | 1.76820 | 71.79 | 0.90 | | Sapphire |
| 2 | 0.35 | 0.11 | | | | | |
| 3(FS) | ∞ | 0.03 | | | | 0.31 | |
| 4 | ∞ | 0.17 | | | | | |
| 5 | 3.90 | 0.35 | 1.88300 | 40.76 | 0.50 | | Optical glass |
| 6(AS) | ∞ | 0.40 | 1.88300 | 40.76 | 0.50 | 0.18 | Optical glass |
| 7 | −0.56 | 0.20 | | | | | |
| 8 | ∞ | 0.40 | 1.52134 | 64.14 | 0.65 | | CD5000/HOYA C.O. Corp. |
| 9(FS) | ∞ | 0.50 | 1.51633 | 64.14 | | | Optical glass |
| 10 | ∞ | 0.35 | 1.51633 | 64.14 | | | Optical glass |
| 11(IP) | ∞ | | | | | | |

A main difference with Embodiment 3 most similar to this embodiment is that an optical part 252 of the cemented lens b200 is a plano-convex lens with a convex surface facing the object side so that the magnification of the plano-convex lens 201 of the cemented lens B200 is lowered and the decentering sensibility of the plano-convex lens 201 is improved. The plano-convex lenses 201 of Embodiments 3 and 5 are identical, but the optical magnification changes and thereby the decentering sensibility also changes. In the Embodiment 3, the paraxial lateral magnification of the plano-convex lens 201 is approximately −1×, and when the amount of decentration of the plano-convex lens 201 is taken as δ and the plano-convex lens is considered as a base, an object height becomes −δ and an image height is +δ(=−δ×paraxial lateral magnification), so that the image is decentered by 2δ. In this way, when the magnification is somewhat shared with the object-side plano-convex lens 252 to reduce the absolute value of the magnification of the plano-convex lens 201, at least the sensibility of the image decentration can be lessened. In the case where the convex surface of the plano-convex lens 201 is decentered by 0.01 mm, the image decentration, the fluctuation of longitudinal spherical aberration from a design state, and the paraxial lateral magnification of the plano-convex lens 201 alone are shown below.

|  | Image decetration (mm) | Longitudinal spherical aberration fluctuation (mm) | Paraxial lateral magnification |
|---|---|---|---|
| Embodiment 3 | 0.02 | 0.025 | −1.01 |
| Embodiment 5 | 0.018 | 0.021 | −0.85 |

As shown in the above data, the positive power is also imparted to the object side of the cemented lens B200 and thereby the decentering sensibility can be lessened.

Figures 10A, 10B, 10C:
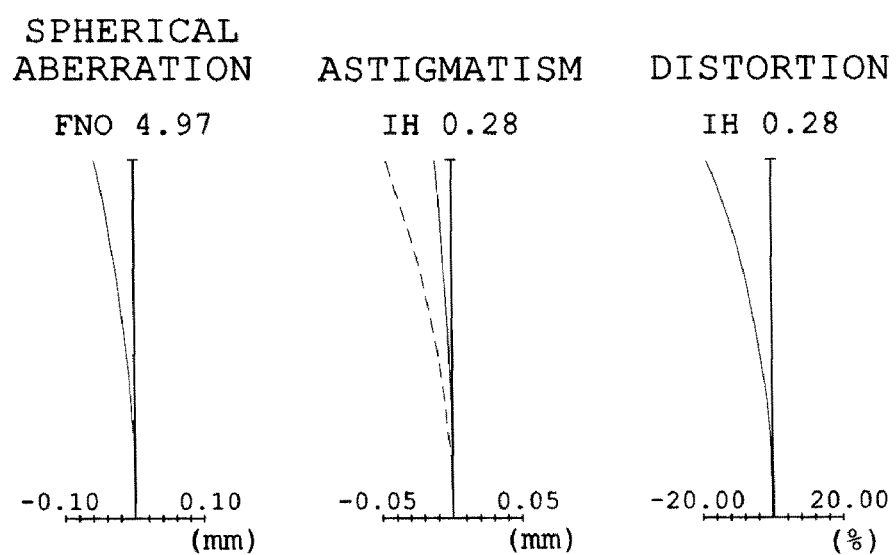
FIGS. 10A, 10B, and 10C are diagrams showing aberration characteristics in Embodiment 5.

Also, the aberration characteristics of this embodiment are as shown in FIGS. 10A-10C.

What is claimed is:

1. An objective optical system for endoscopes, comprising, in order from the object side:
   a single lens with negative power;
   a cemented lens with positive power; and
   an image sensor unit,
   wherein
   the cemented lens has a plano-convex lens, located at an image-side end, with a convex surface facing an image side and an aperture stop placed proximate to a cemented portion and the image sensor unit includes an optically cemented body of at least one optical part, a path bending prism, and a solid-state image sensor to satisfy the following conditions:

$1.5 < T_B/f < 3.5$ $2.4 < T_C/f < 4$ where
   f is a focal length of a whole of the objective optical system,
   $T_B$ is an optical path length of the cemented lens, and
   $T_C$ is an optical path length of the image sensor unit.

2. An objective optical system for endoscopes, comprising, in order from an object side:
   a single lens including a plano-concave lens;
   a cemented lens with positive power; and
   an image sensor unit,
   wherein
   the cemented lens includes one or more flat-plate-shaped optical parts, a plano-convex lens with a convex surface facing an image side, and an aperture stop placed proximate to a cemented portion and the image sensor unit includes an optically cemented body of one or more flat-plate-shaped optical parts, a path bending prism, and a solid-state image sensor to satisfy the following conditions:

$1.5 < T_B/f < 3.5$ $2.4 < T_C/f < 4$ where
   f is a focal length of a whole of the objective optical system,
   $T_B$ is an optical path length of the cemented lens, and
   $T_C$ is an optical path length of the image sensor unit.

3. An objective optical system for endoscopes according to claim 1, further satisfying the following conditions:

$n_{AL} > 1.75$ $n_{BL} > 1.75$ $1 < |f_{BL}/f_{AL}| < 1.6$ $0.65 < |T_{BL}/R_{BL}| < 1$ where
   $n_{AL}$ is a refractive index (a d line) of the single lens,
   $n_{BL}$ is a refractive index (a d line) of the plano-convex lens of the cemented lens,
   $f_{AL}$ is a focal length of the single lens,
   $f_{BL}$ is a focal length of the plano-convex lens of the cemented lens,
   $T_{BL}$ is a thickness of the plano-convex lens of the cemented lens, and
   $R_{BL}$ is a radius of curvature of the convex surface of the plano-convex lens of the cemented lens.

4. An objective optical system for endoscopes according to claim 1, wherein a flare stop is provided between the single lens and the cemented lens and the image sensor unit has a flare stop proximate to an entrance surface cemented portion of the path bending prism.

5. An objective optical system for endoscopes according to claim 1, wherein the cemented lens comprises, in order from the object side,
   an optical part made from a near-infrared light absorbing material,
   an optical flat plate formed with an aperture stop of a metallic light-blocking film on a surface cemented to the plano-convex lens, and
   the plano-convex lens.

6. An objective optical system for endoscopes according to claim 1, wherein the path bending prism has an entrance surface, a reflecting surface, and an exit surface and the reflecting surface is provided with a metallic reflecting film to satisfy the following conditions:

$n_{CP} < 1.65$ $1.1 < T_{CPF}/T_{CPR} < 2$ where
   $n_{CP}$ is a refractive index (a d line) of the path bending prism,
   $T_{CPF}$ is an optical path length from the entrance surface of the path bending prism to the reflecting surface, and
   $T_{CPR}$ is an optical path length from the reflecting surface of the path bending prism to the exit surface.

7. An objective optical system for endoscopes according to claim 1, wherein the image sensor unit includes a reflecting surface protecting member of glass or ceramic having a light transmitting property so that the reflecting surface protecting member is cemented to the reflecting surface of the path bending prism with a light curing-type adhesive.

8. An objective optical system for endoscopes according to claim 1, wherein the optical part of the image sensor unit is coaxial with the cemented lens so that an effective image pickup surface of the solid-state image sensor is decentered in a direction perpendicular to a path bending section with respect to a center of the optical part and thereby a visual field is inclined in a direction perpendicular to the path bending section.

9. An objective optical system for endoscopes according to claim 1, wherein the cemented lens or the image sensor unit includes a laser guide light attenuation filter therein to satisfy the following condition:

$1 < \tau_G \cdot P_V^2 / F_{NO}^2 < 10$ where
   $\tau_G$ is a transmittance (%) of guide light by the laser guide light attenuation filter,
   $P_V$ is a vertical pixel pitch (μm) of the solid-state image sensor, and
   $F_{NO}$ is an F-number.

10. An objective optical system for endoscopes according to claim 1, wherein the cemented lens or the image sensor unit includes a near-infrared light absorbing material therein to satisfy the following condition:

$$1 < \tau_{650} \cdot P_V^2 / F_{NO}^2 < 10$$

where
- $\tau_{650}$ is an internal transmittance (%) of light with a wavelength of 650 nm by the near-infrared light absorbing material,
- $P_V$ is a vertical pixel pitch (μm) of the solid-state image sensor, and
- $F_{NO}$ is an F-number.

11. An objective optical system for endoscopes according to claim 2, further satisfying the following conditions:

$$n_{AL} > 1.75$$

$$n_{BL} > 1.75$$

$$1 < |f_{BL}/f_{AL}| < 1.6$$

$$0.65 < |T_{BL}/R_{BL}| < 1$$

where
- $n_{AL}$ is a refractive index (a d line) of the single lens,
- $n_{BL}$ is a refractive index (a d line) of the plano-convex lens of the cemented lens,
- $f_{AL}$ is a focal length of the single lens,
- $f_{BL}$ is a focal length of the plano-convex lens of the cemented lens,
- $T_{BL}$ is a thickness of the plano-convex lens of the cemented lens, and
- $R_{BL}$ is a radius of curvature of the convex surface of the plano-convex lens of the cemented lens.

12. An objective optical system for endoscopes according to claim 2, wherein a flare stop is provided between the single lens and the cemented lens and the image sensor unit has a flare stop proximate to an entrance surface cemented portion of the path bending prism.

13. An objective optical system for endoscopes according to claim 2, wherein the cemented lens comprises, in order from the object side,
- an optical part made from a near-infrared light absorbing material,
- an optical flat plate formed with an aperture stop of a metallic light-blocking film on a surface cemented to the plano-convex lens, and
- the plano-convex lens.

14. An objective optical system for endoscopes according to claim 2, wherein the path bending prism has an entrance surface, a reflecting surface, and an exit surface and the reflecting surface is provided with a metallic reflecting film to satisfy the following conditions:

$$n_{CP} < 1.65$$

$$1.1 < T_{CPF}/T_{CPR} < 2$$

where
- $n_{CP}$ is a refractive index (a d line) of the path bending prism,
- $T_{CPF}$ is an optical path length from the entrance surface of the path bending prism to the reflecting surface, and
- $T_{CPR}$ is an optical path length from the reflecting surface of the path bending prism to the exit surface.

15. An objective optical system for endoscopes according to claim 2, wherein the image sensor unit includes a reflecting surface protecting member of glass or ceramic having a light transmitting property so that the reflecting surface protecting member is cemented to the reflecting surface of the path bending prism with a light curing-type adhesive.

16. An objective optical system for endoscopes according to claim 2, wherein the optical part of the image sensor unit is coaxial with the cemented lens so that an effective image pickup surface of the solid-state image sensor is decentered in a direction perpendicular to a path bending section with respect to a center of the optical part and thereby a visual field is inclined in a direction perpendicular to the path bending section.

17. An objective optical system for endoscopes according to claim 2, wherein the cemented lens or the image sensor unit includes a laser guide light attenuation filter therein to satisfy the following condition:

$$1 < \tau_G \cdot P_V^2 / F_{NO}^2 < 10$$

where
- $\tau_G$ is a transmittance (%) of guide light by the laser guide light attenuation filter,
- $P_V$ is a vertical pixel pitch (μm) of the solid-state image sensor, and
- $F_{NO}$ is an F-number.

18. An objective optical system for endoscopes according to claim 2, wherein the cemented lens or the image sensor unit includes a near-infrared light absorbing material therein to satisfy the following condition:

$$1 < \tau_{650} \cdot P_V^2 / F_{NO}^2 < 10$$

where
- $\tau_{650}$ is an internal transmittance (%) of light with a wavelength of 650 nm by the near-infrared light absorbing material,
- $P_V$ is a vertical pixel pitch (μm) of the solid-state image sensor, and
- $F_{NO}$ is an F-number.

* * * * *